United States Patent
Hughes

[15] 3,651,863
[45] Mar. 28, 1972

[54] DIFFERENTIATOR IN A COOLING SYSTEM

[72] Inventor: Paul R. Hughes, Englewood, Ohio

[73] Assignee: United Aircraft Products, Inc., Dayton, Ohio

[22] Filed: June 18, 1970

[21] Appl. No.: 47,268

[52] U.S. Cl. .................................165/11, 62/129, 62/131, 62/292, 73/419
[51] Int. Cl. .........................................F25b 45/00
[58] Field of Search ..................73/344, 406, 419, 146.8; 62/77, 125, 129, 131, 292

[56] References Cited

UNITED STATES PATENTS 3,559,727   2/1971   Hill et al. ...................................62/292
1,079,965   12/1913   Waters.........................................73/419

*Primary Examiner*—Meyer Perlin
*Attorney*—J. E. Beringer

[57] ABSTRACT

A differentiator device used in a system circulating a liquid coolant, in which a biased pressure applying member moves to reflect changing temperature induced density of the coolant. A temperature scale is attached to the piston and is in such relative projecting relation to the device that temperature graduations thereon may be read by reference to a portion of the device. The amount of expansion volume may be visually indicated and may be simultaneously compared with an amount proper for the existing ambient temperature. Further, the scale is constructed for manipulation by which the pressure applying member may be preset in charging or filling the system, whereby to insure a properly charged system operative over the complete temperature range.

3 Claims, 2 Drawing Figures

PATENTED MAR 28 1972     3,651,863
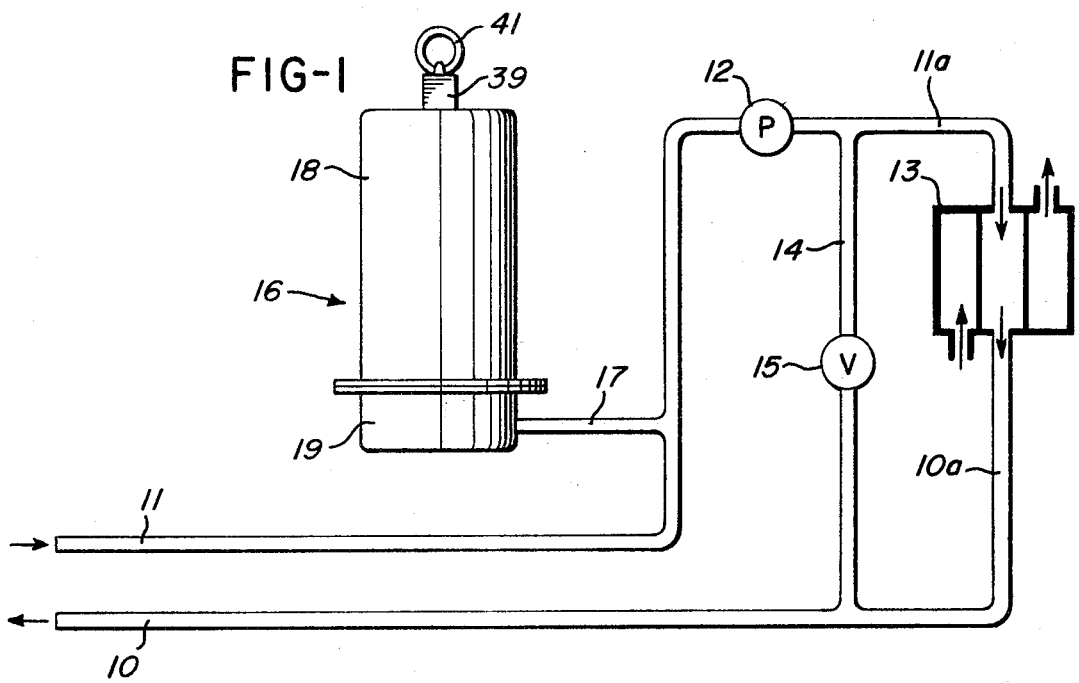
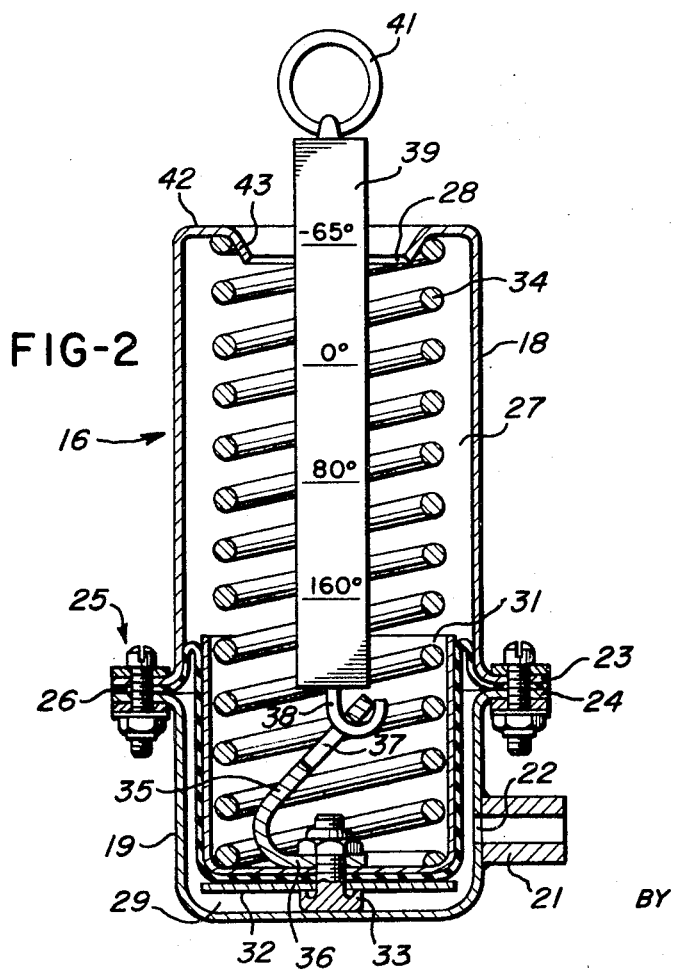
INVENTOR
PAUL R. HUGHES
BY J.E.Beringer
HIS ATTORNEY

3,651,863

DIFFERENTIATOR IN A COOLING SYSTEM

BACKGROUND OF THE INVENTION

This invention relates to systems circulating and cooling a liquid coolant, and particularly to differentiator devices therein maintaining pressure in the system and accommodating temperature induced expansion of the coolant.

Although not so limited, the invention has special application to aircraft and like installations wherein a cooling system may require relatively frequent re-charging and in which it may be subject to widely different ambient temperatures. In the charging or re-charging of a system as described, it is necessary to add coolant in an amount which will insure adequate expansion space under maximum expected temperature conditions and which will insure adequate pressurization under minimum expected temperature conditions. This amount is variable depending upon the existing ambient temperature. As a result, over and under pressurization of a cooling system are possible, tending to cause damage or misoperation, or both.

The present invention provides means to insure a correct charging of the system, irrespective of existing fluid coolant temperature and without the need for special skill on the part of the attendant. The invention is susceptible of a further use by which a continuous indication of expansion volume actually in use is effected with means presented simultaneously to compare such amount with an amount proper for the existing coolant temperature. Movable pressure applying means, and a temperature scale attached or attachable thereto are contemplated by the invention. In initially charging and recharging the system, the attendant determines coolant temperature and effects a retracting or withdrawing motion of the temperature scale relative to the device housing until a temperature on the scale is read corresponding to the fluid coolant temperature. The pressure applying means is pre-set thereby to a selected position within the device whereupon the system is charged or filled with fluid until the limit as defined by the manually positioned pressure-applying means is reached. At this time, the remaining expansion volume in the system is sufficient to accommodate such continuing movement of the pressure-applying means as may be accepted at the maximum temperature value in the operating temperature range. At the same time, the volume accepted in the system is adequate to maintain the minimum desired pressure in the system at a minimum value in the operating temperature range. The temperature scale may form an integrated part of the differentiator device in which case it serves as a continuing indication of expansion volume in use, or, in the alternative, it may be selectively applied in the system on the occasions of initial charging and re-charging.

It is accordingly an object of the invention to provide a differentiator device characterized as in the foregoing, and in achieving the stated ends in a relative simple and inexpensive manner.

Other objects and structural details of the invention will appear from the following description, when read in connection with the accompanying drawings, wherein:

FIG. 1 is a diagram of a cooling system, incorporating differentiator means in accordance with an illustrated embodiment of the invention; and FIG. 2 is a view in longitudinal section of the differentiator device of Fig. 1.

Referring to the drawings, the illustrated system circulates liquid coolant for cooling purposes, as for example to cool electronic equipment in aircraft. The system circulates an appropriate liquid coolant through the electronic equipment or other heat producing source where it absorbs generated heat. From the heat source, the coolant is directed to the cooling system where heat is rejected in a suitable heat transfer device to air, other liquid or to some other medium acting as a heat sink. The coolant is then returned to the heat source where it absorbs additional heat and is again returned for cooling, the process involving a closed flow circuit in which the pump maintains continuous circulation of the flowing coolant.

Referring to the diagrammatic illustration of Fig. 1, liquid coolant is directed to a heat source by way of a conduit 10 and returns therefrom by way of a conduit 11. The latter extends to the suction side of a pump 12, the pressure side of which is connected by a conduit extension 11a to one side of a heat exchanger 13. Within the heat exchanger 13 the coolant is brought into heat transfer relation to another, relatively cooler fluid and is continuously directed through and beyond the heat exchanger by conduit means 10a leading to and forming a part of conduit 10. The conduits 11a and 10a may be suitably bridged by a line 14 constituting a by-pass around heat exchanger 13. A valve 15 in the by-pass opens and closes flow therethrough and may be constructed for automatic operation, as for example in response to changing temperature values of the circulating coolant.

A differentiator 16 is placed in communication with the suction side of pump 12 by a fluid flow line 17 opening into conduit 11. The device 16 provides interior space for expansion of the coolant when increasing temperature brings about a decreasing density thereof. Also, pressure applying means within the device maintains pressure in the system, avoiding pump cavitation. An increasing density of the coolant thus will not allow the pump suction pressure to fall below the desired value, since whatever loss of pressure occurs is compensated for by movement of the pressure applying means. The fluid coolant circulating system is closed. Over pressurization may be provided for, as by connecting pressure relief means to the interior of device 16 on the pressure side of the pressure applying means therein.

As shown in Fig. 2, in its illustrative embodiment, the device 16 comprises cup-shaped housing sections 18 and 19. On the latter, near the closed end thereof, is a fitting 21 registering with a housing opening 22 and providing for connection of the differentiator device in the fluid circulating system, as by attachment to line 17.

On open, opposing ends of the respective housing sections 18 and 19 are circular flanges 23 and 24. In assembly of the housing, the flanges are brought to a face to face relation and clamped together by a circumferential series of installed bolt assemblies 25. At the joint between housing sections 18 and 19 is a flexible diaphragm 26, a peripheral edge of which is received between the flanges 23 and 24 and clamped by bolt assemblies 25. The arrangement is one positively to seal upper and lower interior portions of the device 16 from one another. An upper chamber 27 is vented by a central opening 28 in the base of section 18. A lower chamber 29 serves as the pressure chamber, communicating with conduit 17 by opening 22 and fitting 21.

The diaphragm 26 is flexible and is mounted over the piston and forms itself to be capable of longitudinal deflection within the device. An inverted cup-like piston element 31 is clamped to one side of the diaphragm 26 to project reversely into vented chamber 27, the clamping means including a reactant plate 32 on the other side of the diaphragm and interconnecting bolt means 33. The diaphragm 26 and connected parts form a pressure applying member capable of relative longitudinal motion within the device 16. A compression spring 34 is based on the closed interior end of housing section 18, surrounding opening 28, and is received at its other end within piston 31 to engage the closed inner end thereof. The spring 34 applies a pressure in opposition to fluid pressure in the chamber 29. The diaphragm 26, and connected parts, tends to assume a position in which the opposing pressures are balanced.

The fastener means 33 is positioned in the axis of the piston assembly, which in turns moves substantially axially of the housing assembly. The means 33 confines a part 35 to a seat in the bottom of piston element 31. A flat planar portion 36 of the part 35 seats to the bottom of piston element 31 and has fastener means 33 passed therethrough. To one side thereof, the flat planar or base portion 36 is bent upward and inclines in an overlying relation to fastener means 33 and in intersecting relation to the axis of the piston assembly. Substantially in such axis, the inclining portion of part 35 is formed with an opening 37. Part 35 accordingly provides in a projected, elevated relation to the bottom of piston element 31, a hook-like means. Cooperable therewith is a curved finger 38 on one end of an elongated bar or strip-like plate 39. Plate 39 rises in housing section 18, approximately in the axis thereof and extends to and through opening 28, projecting relatively to this open end of housing section 18. At the projecting end of the plate is attached a ring 41. On a surface of the plate 39 is a longitudinal series of temperature graduations and these may exhibit any desired temperature range. In the illustrated instance, the range is from a −65° F. to a +160° F.

The temperature graduations are read by reference to the position they occupy relative to the open end of housing section 18. Thus, such end provides a flat planar surface 42. In the center of surface 42, opening 28 is formed. An annular area surrounding opening 28 is deformed inwardly to define a lip 43 confining the base end of spring 34. The plate 39, with temperature graduations thereon, forms a temperature scale. Readings of indicated temperature values are taken by sighting laterally across the surface 42.

The temperature graduations on plate 39 are selected and located with reference to variable operational factors, including changing density characteristics of the liquid coolant and the range of temperatures in which the system is expected to operate. With temperature scale 39 permanently or semi-permanently attached to the part 35, the temperature graduations thereon provide useful indication of the amount of available volume in the differentiator device actually in use and by their predetermined calibration designate a proper position of piston element 31 at differential ambient temperatures. Thus, assuming an ambient temperature of 80°, the piston element 31 should be so positioned in the housing assembly as to project temperature scale 39 with its 80° marking substantially at housing surface 42. So positioned, it is known that sufficient unused volume remains in the differentiator to accommodate expansion in the coolant system up to the high limit in the range of expected temperature values. Similarly, with the piston so located, a reduction in coolant pressure down to the low limit of expected temperature values will find spring 34 still sufficiently loaded to apply pressure in chamber 29. The pressure applying means in device 16, as represented by diaphragm 26 and associated parts, moves longitudinally in the differentiator device in response to ambient temperature changes, as these changes affect coolant density. Any given coolant temperature value should find the temperature scale 39 indicating a corresponding temperature value at surface 42. In servicing the system, a position of the temperature scale other than that indicating existing coolant temperature evidences an overcharged or undercharged system and appropriate remedy may be taken.

According to one method of initially charging or re-charging the system, coolant under pressure is admitted to the system in a suitable manner. The temperature of the coolant is previously determined, if it is known to be or may be other than the ambient temperature. The traversal of temperature scale 39 relative to surface 42 is observed, and, when a temperature indication corresponding to existing coolant temperature arrives at surface 42, addition of the coolant is interrupted. In an alternative method, the projecting end of temperature scale 39 is grasped manually at ring 41 and retracted until the desired or proper temperature reading appears at surface 42. Then the system is charged until the liquid coolant fills chamber 29 and counterbalances spring 34. At this point, the system is known to be properly charged and hook 41 is released and the supply of coolant is discontinued.

The latter of the above methods may have particular utility in a concept of use of the invention by which the temperature scale 39 is a tool selectively applied in the system. According to this operational mode the device 16 functions as a normal pressure-accumulator device, absorbing and automatically adjusting to changes in liquid density caused by temperature change. Temperature scale 39 then becomes a service tool. When it is desired to check the device for proper expansion volume, or when initially charging or re-charging the system, the temperature scale is inserted through opening 28 and the finger-like portion 38 interengaged in opening 37 in part 35. Held in a vertical position within the device, the temperature scale as so positioned indicates a temperature reading at surface 42 which should properly correspond to the existing fluid coolant temperature. If the system is to be charged, or re-charged, after finger 38 has been engaged with hook-like member 35, the scale is drawn upwardly or outwardly relative to housing section 18 until a temperature graduation on the scale corresponding to existing fluid coolant temperature arrives at surface 42. The system is then filled, as before described, until the pressure of spring 34 is counterbalanced. The temperature scale is then disengaged from hook-like member 35 and withdrawn.

The arrangement is one providing for simplified servicing of the cooling system. Special skill and experience on the part of the service attendant is unnecessary. Moreover, a means for precise correlation between pressure and temperature values in the system is provided enabling the differentiator device and connected parts of the system to be made to accurately controlled capacities. Small, light weight systems are possible, in keeping with and facilitating application of the system to aircraft and like use.

Modifications in structural details of the invention are, of course, possible, it being intended that the invention should be limited only as indicated in attached claims.

What is claimed is:

1. In a system circulating a fluid coolant, a pressure applying differentiator device communicating with the system and having an expansion volume to accommodate changes in coolant density over a predetermined range of temperatures, said device including a housing closed at one end and open at the other, a piston in said housing spring urged toward said closed end, the system being communicable with said housing at said closed end and said piston applying pressure thereto and moving automatically in response to variations in fluid density caused by temperature change, and scale means attachable to said piston within said housing and extending to said open end to project therefrom, the projecting end of said scale means being presented for manual retraction to pre-set said piston to a selected position of adjustment defining a limit for charging of the system, said scale means having a longitudinal series of progressively changing temperature graduations read by reference to their position relative to the open end of said housing, said piston being retracted to a pre-set position in which the indicated temperature reading corresponds to existing fluid coolant temperature.

2. A device according to claim 1, characterized by means facilitating attachment of said scale means to said piston and detachment therefrom by manipulation from the projecting end thereof exteriorly of said housing, said scale means having a utility thereby as a service tool.

3. In a system circulating a fluid coolant, a pressure applying differentiator device communicating with the system and having an expansion volume to accommodate changes in coolant density over a predetermined range of temperatures, said device including a housing closed at one end and open at the other, a piston in said housing spring urged toward said closed end, the system being communicable with said housing at said closed end and said piston applying pressure thereto and moving automatically in response to variations in fluid density caused by temperature change, and scale means attachable to said piston within said housing and extending to said open end to project therefrom, the projecting end of said scale means being presented for manual retraction to pre-set said piston to a selected position of adjustment defining a limit for charging of the system, said scale means having a longitudinal series of progressively changing temperature graduations read by reference to their position relative to the open end of said housing, said piston being pre-set to a position in which the indicated temperature reading corresponds to existing fluid coolant temperature, said piston including an assembly comprising a flexible diaphragm stretched across and sealing the said closed end of said housing, a cup-shaped member having its closed end seated on and secured to said diaphragm and a hook-like member secured to the bottom interior of said cup-shaped member and projecting upwardly therein, said scale means having a finger on its end opposite said projecting end to interengage with said hook-like member.

* * * * *